United States Patent
Cramp et al.

[15] 3,672,207
[45] June 27, 1972

[54] APPARATUS FOR VERIFYING HERMETICITY OF SMALL ELECTRONIC ASSEMBLIES

[72] Inventors: Allen R. Cramp, Laguna Beach; Kenneth J. Brion, Fullerton, both of Calif.

[73] Assignee: North American Rockwell Corportion

[22] Filed: Jan. 4, 1971

[21] Appl. No.: 103,450

[52] U.S. Cl. ............................................................73/40.7
[51] Int. Cl. ......................................G01m 3/02, G01m 3/20
[58] Field of Search...................73/52, 40, 40.7, 38, 49.2, 73/49.3

[56] References Cited
UNITED STATES PATENTS 3,572,096   3/1971   Meyer......................................73/40.7
3,186,214   6/1965   Roberts....................................73/40.7

Primary Examiner—Louis R. Prince
Assistant Examiner—William A. Henry, II
Attorney—L. Lee Humphries, H. Fredrick Hamann and Robert G. Rogers

[57] ABSTRACT

A sealed package in a test chamber is exposed to the flow of a high purity inert carrier gas at a lower than atmospheric pressure. If the sealed package leaks, the carrier gas purity level changes and is measured by a gas chromatograph detector. Buffer chambers surrounding the test chamber are continuously purged of any contaminants for preventing contamination of the test chamber from outside sources.

10 Claims, 3 Drawing Figures

FIG. 1

INVENTORS
ALLEN R. CRAMP
BY KENNETH J. BRION

Robert G. Rogers
ATTORNEY

APPARATUS FOR VERIFYING HERMETICITY OF SMALL ELECTRONIC ASSEMBLIES

BACKGROUND OF THE INVENTION

1. Field of the Invention

The invention relates to process and apparatus for verifying hermeticity of small electronic assemblies and more particularly to an improved leak test method wherein an inert carrier gas at lower than atmospheric pressure is passed over a test specimen and then to a detector where the carrier gas purity is measured.

2. Description of Prior Art

In general, leaks in hermetically sealed devices fall into the categories of fine leaks (less than $1 \times 10^{-4}$ cc/sec std atm) and gross leaks (greater than $1 \times 10^{-4}$ cc/sec std atm). The most common fine leak test method is a mass spectrometer detector instrument tuned for helium. The test specimen is pressure impregnated with helium, which is used as the tracer gas, and then placed in a test cell which is pumped down to a hard vacuum. The detector instrument is sensitive to helium leaking from the test specimen and is, in general, sensitive only to fine leaks. The sensitivity limit to large leaks is a function of vacuum pump down time and specimen internal volume. For a more detailed description, see U.S. Pat. No. 3,416,359 by H. A. Durbin et al which issued on Dec. 17, 1968.

Patent application Ser. No. 785,879 by R. A. Meyer, filed Dec. 23, 1968, now U.S. Pat. No. 3,572,096, assigned to North American Rockwell Corporation, and entitled "Method and Apparatus for Inspecting Sealed Packages for Leaks," discloses a method of and apparatus for inspecting sealed packages for leaks where a sealed package in an inspection fixture is exposed to a carrier gas for a short time period that results in a readout developed by a detector instrument which distinguishes gross and fine package leaks. The Meyer inspection fixture has one buffer or secondary chamber to prevent leakage into the test or primary chamber.

Although providing a substantial improvement over prior leak detectors, the device of Meyer is believed to have low sensitivity and no easy calibration method. The lack of sensitivity is due partly to test cell pressure being higher than the internal pressure of the package. For most leak testers, the test cell pressure and the internal pressure of the package must equalize before the gas will diffuse from the package.

Further, the device of Meyer provides leak test data which is not correlatable with commonly used leak detection methods because it does not provide a definite pressure bias across the leak. In essence, the method of Meyer measures diffusion rate across a hole rather than leak rate caused by pressure differential. Allowable leak rates are characteristically specified as a rate resulting from a given pressure drop across the leak. The units are cc/sec - std atm. for the particular gas.

SUMMARY OF THE INVENTION

Briefly, the test cell comprises a test chamber for a hermetically sealed device and at least one buffer chamber around the test chamber. An inert gas continuously purges the buffer chamber to prevent contamination of the test chamber from external sources and to verify the seal of the test chamber.

A gas source provides an inert non-radioactive gas at a reduced pressure through the rest chamber for pulling impurities from the sealed device. The gas is at a pressure less than atmospheric and less than the pressure inside the sealed device. An impurity detector is provided for measuring any impurities in the gas from the test chamber.

In the preferred embodiment a moisture and cryogenic gas preparation means is provided to dry and clean the gas. Control valves and other fluid flow and pressure regulatory elements are also included. In addition, a plurality of buffer chambers are included for providing test chamber isolation using a flow of buffer gas at preselected pressures to form pressure barriers and to continuously purge or flush the buffer chambers during the test.

In operation, a test specimen is placed in the test chamber, the residual atmosphere gas is purged from the test chamber by a sweep gas while a carrier gas is being routed directly to the detector where the gas contamination level is measured. The carrier gas is then routed through the test chamber to flow around the test specimen which may be an electronic assembly. A lower purity level of the carrier gas detected by the detector indicates the presence of a leak in the test specimen.

During the test, the buffer chambers are continuously purged with an inert gas at preselected pressures to establish a barrier around the test chamber to preclude the leakage of ambient gas into the test chamber. One or more of the buffer chambers can be adapted to monitor the gas flowing therein. As a result, the test cell seal can be checked and detector indications verified.

The configuration of the test cell can be modified to allow for frequent calibration of the system. The invention also provides data that is correlatable with commonly used leak test methods.

It is therefore an object of the present invention to provide an improved process and apparatus for verifying the hermeticity of sealed devices.

It is another object of the present invention to provide a process and apparatus for improving the sensitivity of a leak tester by using relatively contaminant free inert gas at a pressure less than the pressure of the sealed device being tested.

It is another object of the present invention to provide an improved process and apparatus for distinguishing gross, medium and fine package leaks in one test.

It is another object of the present invention to provide an improved process and apparatus for providing a leak detector with improved sensitivity that allows for system calibration.

These and additional objects will become more apparent when taken in conjunction with the following description and drawings in which like characters indicate like parts.

BRIEF DESCRIPTION OF THE DRAWINGS

FIG. 1 is a schematic diagram of the apparatus for verifying hermeticity of small electronic packages employing one form of the test cell.

DESCRIPTION OF THE PREFERRED EMBODIMENT

Figure 2:
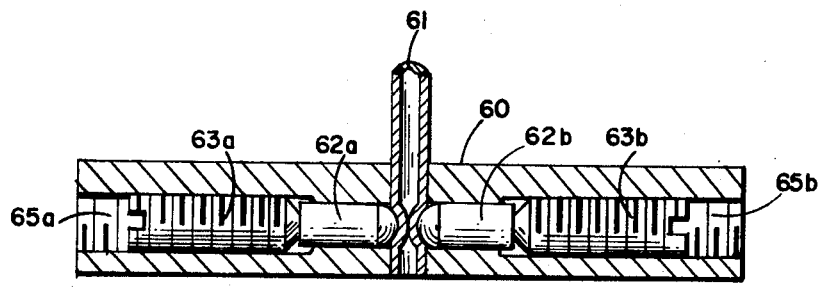
FIG. 2 illustrates a modification of the test cell of FIG. 1 which can be used with the apparatus of the invention.

Referring to FIG. 1, one form of the apparatus for verifying hermeticity of small electronic assemblies in accordance with the present invention includes a test cell 10 which in the form as shown has separable mating elements 12 and 13 that are releasably mated together by clamps or other appropriate means to provide mutual fluid flow and pressure isolation of test chamber 11, buffer chambers 15 and 16 and the test cell ambient atmosphere. Resilient sealing members 14, which can be O rings or the like, are positioned as shown and facilitate fluid flow and pressure isolation and determine the test chamber 48 and the buffer chambers 15 and 16.

In the apparatus of FIG. 1, inert non-radioactive gas source 17 is connected to regulator 35 which controls the flow of gas in line 36 through moisture trap 18 and cryogenic gas cleaning trap 19 to regulators 30 and 31. The gas source is connected through regulator 30 by means of valve 23 to test chamber 48. The gas source 17 is also connected by regulator 31 through valve 22 to test chamber 48. In addition, the gas source 17 is connected through regulator 31 by means of valve 21 to buffer chamber 15. Gas source 17 is also connected by regulator 30 by means of valve 23 and 24 through moisture trap 27 to detector 29. Gas source 33 contains the same inert non-radioactive gas as gas source 17 and is connected by regulator 34 to buffer chamber 16.

Gas outlet lines 43, 44 and 45 are connected respectively to buffer chambers 16 and 15 and to test chamber 48. Outlet gas from test chamber 48 flows through line 45 and is either directed to detector 29 by valve 24 or is exhausted into sub-ambient pressure container 32 by means of valve 25. Gas flowing through detector 29 is exhausted into sub-ambient pressure container 32 by means of valve 28. Outlet gas from buffer chamber 15 is exhausted into sub-ambient pressure container 32 by valve 26. Gas from source 33 flowing into buffer chamber 16 by means of line 42 is exhausted into the ambient atmosphere from buffer chamber 16 by means of line 43. It is obvious to one skilled in the art that gas sources 33 and 17 may be combined. However, in the preferred embodiment in the present invention these gas sources are separated since it is more important that gas flowing through buffer chamber 15 and through test chamber 48 be of high purity whereas the gas in gas source 33 may be less pure since requirement for high purity gas in buffer chamber 16 is not as important. Vacuum pump 20 exhausts gas from sub-ambient pressure container 32 into the ambient atmosphere through line 37. A cryogenic trap is provided to prevent back diffusion of pump oil vapors into container 32.

Proper operation of the present invention requires certain relative pressures to exist in certain areas. For instance, typical absolute pressures may be one psi in sub-ambient pressure container 32, six to twelve psi in test chamber 48, five psi in buffer chamber 15, eighteen psi in buffer chamber 16, and sixty psi in line 39. It is therefore seen that a leak between test chamber 48 and buffer chamber 15 would effect a flow of gas from test chamber 48 to buffer chamber 15 and not vice versa. Likewise, a leak between buffer chamber 16 and the test cell ambient atmosphere would effect a flow of gas from buffer chamber 16 to the ambient atmosphere. Also, the presence of regulators 30 and 31, and valves 21, 22, 23, 24, 25, and 28 within subambient pressure container 32 will effect that any leaks in the aforementioned regulators or valves would be from the regulators and/or valves into the sub-ambient pressure tank container 32. Therefore, the regulators and valves pertinent to the carrier gas flowing through test chamber 48 and the buffer gas flowing through buffer chamber 15 are arranged so that any leaks in the regulators or valves would not contaminate the gas flowing through the test cell. The sub-ambient pressure container 32 is therefore a pressure reference for the regulators supplying carrier gas to test chamber 48 and buffer gas to buffer chamber 15 and is important in preventing contamination of the test cell.

There are three gas functions in the system. The first is carrier gas which always flows to the detector 29 either through the test cell 48 or by means of bypass line 46. The second is sweep gas which is used only to flush residual atmospheric gas out of the test chamber 48 after the test specimen 11 has been inserted. The third is buffer gas which is directed to flow through the buffer chambers 15 and 16 and is used to establish a barrier around the test cell to preclude the leakage of atmospheric gas into the test cell. Moisture and cryogenic traps are provided as shown for selective cleaning of the gas.

In operation, a test specimen 11 is first inserted into the test chamber 48 of test cell 10 and mating members 12 and 13 are mated to isolate the specimen 11 from the test cell ambient atmosphere.

After the test cell is closed, pressure regulators 35 and 31 are actuated and valve 22 is opened to allow the sweep gas to flush or purge the residual atmosphere from the test chamber 48 with the gas being exhausted into sub-ambient pressure container 32 by valve 25. At the same time, pressure regulator 30 is actuated and valves 23 and 24 are opened to bypass the test cell and allow the carrier gas to flow directly to the detector 29 where the gas contamination level is measured. After a predetermined amount of time, valves 22, 23 and 24 are aimultaneously actuated to direct the carrier gas through the test chamber 48, to flow around the test specimen, and by means of line 45 through valve 24 on to detector 29. A flower purity level of the carrier gas after being passed around the test specimen is detected by the detector and indicates the presence of a leak in the test specimen.

The test cell operating pressure controlled by gas regulator 30 is adjusted to a definite pressure level below the internal pressure of the test specimen. Buffer gas pressure is adjusted by regulator 31 so that the inner buffer chamber 15 is below test cell pressure and by regulator 34 so that the outer buffer chamber 16 is above atmospheric pressure. When the test cell 10 is open for loading of the test chamber with another test specimen, appropriate regulators and valves are operated to restrain gas flow. For instance, valve 26 is closed to prevent loss of sub-ambient pressure in the container 32 and valve 28 is closed to prevent flow from container 32 into detector 29.

During the test, the buffer chambers 15 and 16 are continuously purged with the inert gas from gas sources 17 and 33 to establish a barrier around the test chamber 48 to preclude the leakage of ambient gas into the test chamber. As can readily be seen, one or more of the buffer chambers of the present invention can be adapted by means of appropriate valves to monitor the gas flowing therein and as a result, the test cell seal can be checked and detector indications verified.

The configuration of the test cell 10 can be modified to allow for frequent calibration of the system. This calibration will then allow for correlation between the data produced by the detector and other commonly used leak test methods. FIG. 2 illustrates a mechanical leak 60 which is a modification of the test cell 10 of FIG. 1 which can be used with the apparatus of the present invention. More particularly, FIG. 2 illustrates a modification of mating part 12 of test cell 10 wherein a gas inlet 61 is provided such that drive screws 65a and 65b apply pressure to squeeze pistons 62a and 62b which in turn squeeze gas inlet tube 61. In operation, the mechanical leak 60 is mated to test cell member 13 instead of mating member 12 to member 13. A contaminant gas typical of what will be leaking from a leaky test specimen during leak testing of the test specimen is allowed to leak into the test chamber at a controllable rate and pressure by means of adjustment of screws 63a and 63b. A calibration curve is thus obtained wherein a known amount of contaminant is leaked into the test chamber. Therefore, a corresponding point on the calibration curve obtained during test of a specimen will indicate a contaminant leak corresponding in cc/second std atm to the measured leak allowed to pass through the mechanical leak during the calibration procedure. The calibration procedure thus also allows for comparison of the test results of the present invention to commonly used leak test methods where the rest results are in units of cc/second std atm.

The detector 29 is a gas chromatograph wherein the inert gas molecules are bombarded in a tritium cell, the tritium knocking an electron of the inert gas to an outer ring of the inert gas thus effecting a metastable state. The inert gas then readily collapses to its normal state, giving up energy in the form of a photon to the leaked contaminating gas, such as $N_2$, $O_2$, $CO_2$, etc. thereby ionizing the contaminating gas. The ionized gas is then attracted to a plate of the tritium cell providing a calibratable signal. Therefore, in essence, the detector monitors the purity of the inert gas. If the test specimen leaks, the level of inert gas purity changes and can be measured.

Figure 3:
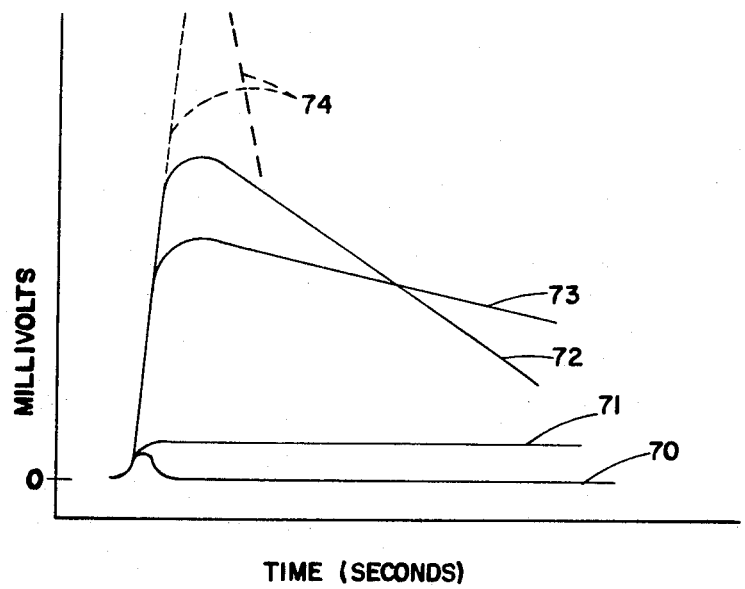
FIG. 3 is a graphical representation of curves developed by the leak detection process and apparatus of the invention when testing sealed packages for the presence or absence of leaks.

Referring to FIG. 3, there is presented a graphical representation of curves developed by the leak detection process and apparatus of the present invention for testing sealed test specimens for the presence or absence of leaks. Curve 70 is a detector trace indicative of no leak in the test specimen. Curve 71 is indicative of a fine leak with curves 72 and 73 indicative of gross leaks. Dotted curve 74 presents a trace normally typical of the early part of a detector leak signal wherein the valve and regulator arrangement of the invention is not optimized to provide minimum dead volume and adequate port to port seal. The regulator and valve arrangement of the present invention as shown in FIG. 1, has significantly improved the characteristic output signal shown by curve 74 so that the signal, even during the first few seconds, is as shown by the solid curves and is on scale and usable. The result is that readout problems and test times are considerable reduced.

While there has been shown what is considered to be preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

We claim:

1. Apparatus for detection of leaks in sealed devices comprising,
    a test chamber for a sealed device;
    means for isolating said test chamber from the ambient atmosphere;
    at least one gas source providing a supply of carrier gas at predetermined pressures;
    means for providing a flow of said carrier gas from said supply through said test chamber and around said sealed device;
    detector means for detecting impurities contributed to said carrier gas by said sealed device;
    means for routing said carrier gas from said test chamber to said means for detecting impurities; and
    a sub-ambient pressure reference container enclosing at least said means for routing said carrier gas to said detector means.

2. The invention according to claim 1 and further comprising,
    a plurality of buffer chambers for isolating said test chamber from the ambient atmosphere;
    each of said buffer chambers positioned whereby each succeeding one of said buffer chambers surrounds each preceding one of said buffer chambers to provide fluid flow and pressure isolation of said test chamber and said buffer chambers each from the ambient atmosphere and from each other; and
    said test chamber and each of said buffer chambers having inlet and outlet means for passing gas through said chambers.

3. The invention according to claim 2 and further comprising,
    means for providing said carrier gas to said test chamber and said buffer chambers at selected relative pressures;
    said pressures selected to provide pressure barriers to leaks into said test chamber.

4. The invention according to claim 1 wherein said gas source further comprises,
    control valve means for providing a sweep gas at a preselected pressure to purge residual atmosphere from said test chamber prior to testing said sealed device;
    control valve means for continuously purging said buffer chambers with buffer gases at preselected relative pressures during test of said sealed device;
    said buffer gases having relative pressures to cause a leak between said test chamber and said buffer chambers to effect a flow of gas from said test chamber;
    control valve means for providing said carrier gas at a preselected pressure to said test chamber during test of said sealed device; and
    said carrier gas being further routed to said detector where the impurity level of said carrier gas is measured by said detector wherein said impurity level indicates the presence or absence of a leak in said sealed device.

5. The invention according to claim 4 wherein the respective pressures of said buffer gases flowing through said buffer chambers relative to each other, to said test chamber and to the ambient atmosphere of said test cell are selected to minimize leaks through said buffer chambers between the ambient atmosphere and said test chamber.

6. The invention according to claim 4 wherein the gas flowing through at least one of said buffer chambers is monitored to provide a self check of the isolation of said test cell from ambient atmosphere and to verify detector indications.

7. Apparatus for detecting leaks in sealed devices comprising,
    a test cell containing an inner test chamber adapted to receive sealed device and to isolate it from ambient atmosphere;
    at least one gas source providing a supply of gas at predetermined pressures;
    detector means for analyzing the purity of said gas;
    control valve and other fluid flow and pressure regulating elements connecting said test cell, said detector and said gas sources to provide that a carrier gas at preselected pressure flows around said test specimen through said test cell and to said detector, said detector analyzing the purity level of said gas passing through said test cell and detecting the impurity exuding from a leak in said sealed device; and
    said control valve and other fluid flow and pressure regulating elements include a vacuum providing device and a sub-ambient pressure reference container that encloses at least said control valve elements routing said carrier gas to said detector.

8. Apparatus for detecting leaks in hermetically sealed devices comprising,
    a test cell with an inner test chamber adapted to provide a receptacle for a hermetically sealed device and to isolate it from ambient atmosphere;
    at least one buffer chamber wherein the innermost of said buffer chambers isolates said test chamber from test cell ambient atmosphere;
    each of said buffer chambers positioned whereby each succeeding one of said buffer chambers surrounds each preceding one of said buffer chambers to provide fluid flow and pressure isolation of said test chamber and said buffer chambers each from the test cell ambient atmosphere and from each other;
    at least one gas source providing a supply of an inert non-radioactive gas at predetermined pressures;
    said test chamber and each of said buffer chambers having inlet and outlet means for passing gas through said chambers;
    gas chromatograph detector means insensitive to said inert non-radioactive gas but sensitive to said impurities in said gas for analyzing the purity of said gas;
    control valve and other fluid flow and pressure regulating elements connecting said test cell and said gas sources so that said gas flows around said test specimen through said test cell and connecting said test cell and said detector so that said detector analyzes the purity level of said gas passing through said test cell and detects only the impurity exuding from a leak in said hermetically sealed device; and
    said control valve and other fluid flow and pressure regulating elements include moisture and cryogenic traps, a vacuum providing device, and a sub-ambient pressure reference container enclosing at least the valves routing said inert non-radioactive gas to said detector.

9. The invention of claim 8 in which said gas source further provides,
    means for providing a sweep gas to purge residual atmosphere from said test chamber prior at test of said hermetically sealed device;
    means for providing buffer gases at preselected pressures to form pressure barriers and to purge said buffer chambers continuously during test of said hermetically sealed device;
    means for providing a carrier gas at reduced pressure to said test chamber during test of said hermetically sealed device with said carrier gas routed through said test chamber to flow around said sealed device; and
    said carrier gas being further routed to a detector where the impurity level of said carrier gas is measured by said detector wherein said impurity level indicates the presence or absence of a leak in said hermetically sealed device.

10. The invention according to claim 8 wherein said apparatus for detecting leaks further comprises, means for providing calibration of said apparatus so that results are correlatable with other leak testers wherein leaks are rated in units such as cc/sec - std atm.

* * * * *